Oct. 2, 1951   G. A. LYON   2,569,482
WHEEL COVER
Filed Nov. 22, 1946
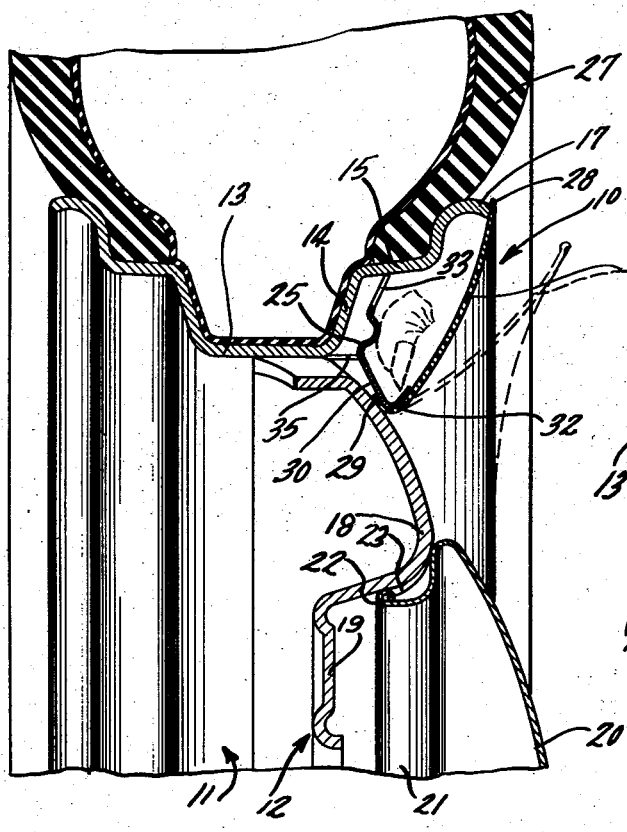
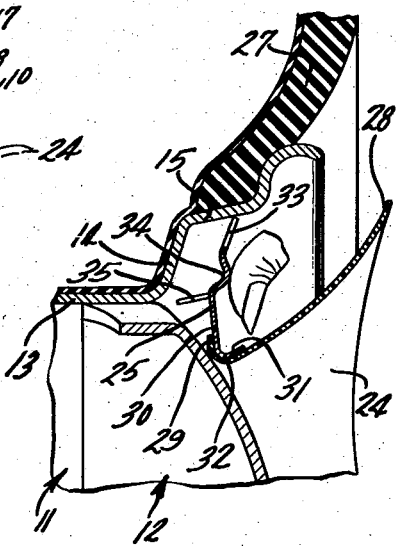
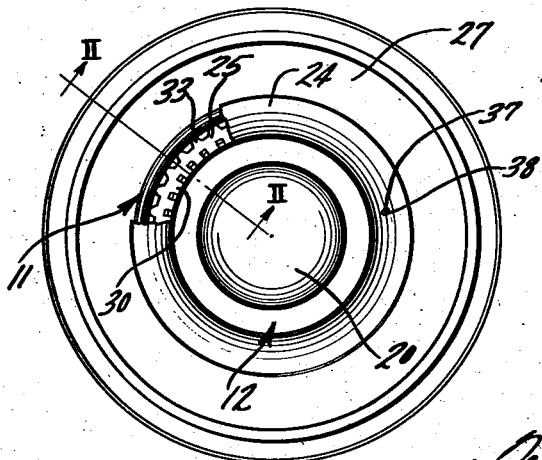
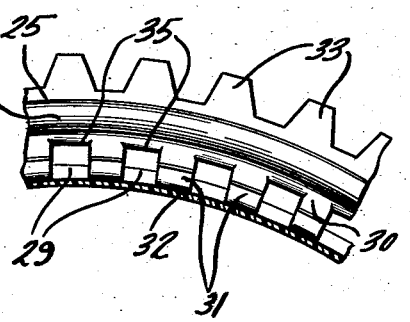
INVENTOR.
GEORGE ALBERT LYON
BY
ATTYS.

Patented Oct. 2, 1951

2,569,482

UNITED STATES PATENT OFFICE 2,569,482

WHEEL COVER

George Albert Lyon, Allenhurst, N. J.

Application November 22, 1946, Serial No. 711,719

11 Claims. (Cl. 301—37)

This invention is directed to an improved wheel structure and relates more particularly to a new and improved cover assembly therefor.

An important object of this invention is to provide in a wheel structure an improved cover assembly having novel retaining means for maintaining the cover over the outer side of the wheel structure to conceal the same.

Another object of the invention is to provide in a wheel structure including a tire rim and a central load sustaining part having at the juncture thereof a relatively deep outwardly opening grooved formation; a wheel cover extending from the outer edge of the tire rim into said groove to conceal the tire rim and said juncture; and including improved retaining means received within said groove behind the cover and maintaining the inner under turned margin of the cover member clamped under substantially uniform tensioned pressure.

Still another object of the invention is to provide an improved wheel structure and cover assembly therefor wherein a new and improved retaining member is adapted to be mounted in a novel manner to maintain a trim ring under clamping tension on the wheel.

A further object of the invention is to provide improved retaining means for a wheel cover.

In accordance with the general features of my invention, there is provided a wheel structure having a tire rim of the drop center type formed with a plurality of stepped flanges and a central load bearing portion secured to the base flange of the tire rim, a cover for the outer side of the wheel structure including a member disposed in concealing relation to the tire rim and extending generally axially inwardly and radially inwardly and having an underturned portion engaging the wheel body, and a retaining ring member wedgingly engaging the tire rim and having radially inwardly extending resilient clamping fingers thereon engaging the underturned portion of the cover member to hold the latter clamped against the load bearing portion of the wheel.

In accordance with other features of my invention, the retaining member has generally axially inwardly extending limit fingers which engage at the juncture of the tire rim and load bearing portion of the wheel and hold the retaining member in uniformly spaced relation to the wheel structure so that the pressure exerted by the radially inner retaining fingers thereof against the underturned portion of the cover member will be substantially uniform throughout the inner circumference of the retaining ring.

Another feature of the invention relates to making the cover member of plastic and a retaining ring of metal so that the retaining ring can assist in reinforcing and backing up the cover member.

It is also a feature of the invention to provide a wheel cover and retaining means therefor in which the retaining means is formed as a spring metal ring arranged to be pressed into retaining engagement with a wheel structure and as an incident to being so pressed into retaining engagement being placed under substantially uniform gripping tension against an interposed portion of the cover for retaining the cover in place on the wheel.

Other objects, features and advantages of the present invention will become apparent from the following description and the accompanying drawings in which:

Figure 1 is a side elevational view of a wheel structure embodying one form of my invention, with a portion of the cover broken away to reveal certain details of construction;

Figure 2 is a fragmentary radial cross-sectional view on an enlarged scale taken substantially along the line II—II of Figure 1;

Figure 3 is a radial cross-sectional view similar to Figure 2 but showing the cover in an intermediate stage of assembly with the wheel structure; and Figure 4 is a fragmentary plan view of the retaining ring of the cover assembly.

As shown on the drawings:

My present invention is embodied in a cover structure 10 particularly adapted for use with a vehicle wheel such as an automobile wheel including a drop center multi-flanged tire rim 11 and a load sustaining portion or body 12. The tire rim 11 comprises a base flange 13, side flanges 14, intermediate generally axially extending flanges 15 and outwardly curled terminal flanges 17. The wheel body 12 may comprise a conventional metal stamping secured at its radially outer margin to the base flange 13 of the tire rim and is formed with an axially outwardly protruding annular reinforcing nose 18 and a central bolt-on flange 19 by which the wheel is secured to an axle part of the vehicle as by means of cap screws or bolts (not shown).

The central depression in the wheel body 12 including the bolt-on flange 19 is adapted to be covered by a hub cap 20 having generally axially inwardly extending flange 21 formed with a bead 22 which is adapted to engage retaining bumps 23 formed at the inner side of the nose portion 18.

According to the present invention, the cover 10 is adapted to provide an ornamental closure and cover for the outer side of the flanged tire rim 11 and the juncture of the rim and body parts of the wheel and to extend into the relatively large outwardly opening reentrant groove formed between the tire rim and the nose portion 18 of the wheel body. To this end the cover 10 comprises a trim ring 24 and a retaining member 25 so interrelated and assembled that the cover assembly is adapted to be mounted upon the wheel by pressing the cover axially inwardly into place on the wheel, and being there maintained under uniform tension.

The trim ring member 24 is preferably formed from a relatively thin sheet material which is resiliently flexible, enabling it to be flexed out of its normal shape or position without permanent distortion and enabling it to snap back to the original shape and position when the flexing force and pressure is relieved therefrom, thereby affording a self-sustaining and form-retaining as well as flexible structure. For this purpose, I have found a synthetic plastic sheet material such as ethyl cellulose, cellulose acetate, vinyl resins and the like particularly satisfactory.

In this construction, the trim ring member 24 can be made of a white or light color so that by having the trim ring formed of concavo-convex cross sectional shape and of a width and curvature to extend from the outer terminal flange 17 of the tire rim to the load-sustaining portion 12 of the wheel radially inward from the juncture of the tire rim and the load sustaining member and at the radially outer side of the nose 18 thereof, the trim ring will afford the appearance of being an inward extension of the side wall of a tire 27 supported in the tire rim 11. Thereby is simulated a white side wall of a tire of relatively massive proportions and appearing to extend clear down to the body of the wheel.

At its outer margin, the trim ring member 24 may be formed with an outwardly curved, inwardly bowed flange formation 28 for reinforcing the same and to facilitate concentric, close seating of the trim ring upon the outer edge of the outer terminal flange 17 of the tire rim. At its radially inner margin, the trim ring 24 is formed with a curved underturned marginal flange 29 which is adapted to seat against the wheel body 12 adjacent to but spaced radially inwardly from the junction of the rim and the wheel body.

The retaining member 25 is so constructed and arranged that it engages the inner marginal underturned flange 29 of the trim ring and resiliently clamps the same against the wheel body with substantially uniform pressure. To this end, the retaining member 25 is formed as a ring of resilient, springy material which may be of a relatively stiff plastic but is preferably springy sheet metal and is adapted to be maintained in cover-retaining position by wedging engagement with the outer intermediate flange 15 of the tire rim.

In its initial form, the retaining ring 25 is adapted to lie in a plane substantially parallel to the median plane of the wheel and has a uniform series of generally radially inwardly extending inner marginal integral spring fingers 30 each of which is formed with an outwardly return bent flange 31 integrally joined to its finger by a rounded shoulder 32 substantially complementary to and adapted to fit within the groove provided between the trim ring inner marginal flange 29 and the body of the trim ring. Thereby, the trim ring 24 and the retaining member 25 are adapted to be interlockingly assembled by relative axial assembly movement wherein the trim ring member 24 is flexed into the interlocked assembled relationship.

Then the cover assembly 10 is to be mounted upon the wheel by axially inward finger pressure applied to the axially outer side of the retaining member 25 substantially as shown in Figure 3, whereby to force a uniformly radially outwardly extending series of outer radial marginal retaining fingers 33 into biting, wedging engagement with the radially inner side of the outer intermediate flange 15 of the tire rim. Initially, the biting, wedging fingers 33 are of a length to extend on a circumference of slightly greater diameter than the inside diameter of the flange 15 so that as the retaining ring 25 is pushed axially inwardly into the mounted position on the wheel the fingers 33 assume a flexed, biting, wedging engagement against the rim flange 15. As shown in dash outline in Figure 2, the resilience of the cover member 24 permits it to flex open advantageously during the press-on mounting of the cover.

Adequate strength in the retaining ring 25 to resist deformation of the ring body thereof under the axially inward finger pressure in mounting the cover, and also to resist buckling under the stresses imposed by tensioning of the retaining finger 33, is imparted to the body of the retaining member by an annular, preferably axially outwardly projecting, integral reinforcing rib 34.

Since the widths of the trim ring 24 and the retaining member 25 are such that the complementary, interlocked radially inner margins thereof engage the wheel body after the retaining ring has been pressed home only part of the way, in the present instance approximately half way, further axially inward pressure against the retaining ring tends to place the cover retaining fingers 30 under tension against the wheel body whereby to clamp the interposed inner marginal flange 29 of the trim ring under tension against the wheel body, the retaining fingers 30 flexing generally axially outwardly as a result of this action and as permitted by the resilient nature thereof.

Since non-uniform tensioning of the retaining fingers 30 of the retaining ring 25 would tend to place undue strain upon certain portions of the retaining ring while other portions might not be in proper trim ring clamping position, means are provided for assuring uniform seating of the retaining ring 25 and substantially uniform flexible clamping engagement of the retaining fingers 30 with the trim ring flange 29 as well as uniform biting, wedging engagement of the attachment fingers 33. Herein such means comprise a uniform series of axially inwardly extending limit flanges or fingers 35 which are preferably formed integral with the retaining ring 25 and are struck out therefrom alternately with the retaining fingers 30.

The limit fingers or flanges 35 are of such length and are so disposed that when the retaining ring 25 has been pushed fully home these stop fingers engage endwise with the wheel structure as, for example, at the juncture of the load bearing part 12 with the tire rim base flange 13, as shown in Figure 2. In this position of the retaining ring 25 the biting fingers 33 are under uniform strong wedging tension due to the customary reduction in the inside diameter of the intermediate tire rim flange 15 adjacent to its axially inner side. The trim ring retaining fingers 30 are also under the maximum desired clamping tension under which they are maintained by the thorough securement of the retaining ring member 25 by the biting fingers 33. By reason of the stop fingers 35, it will be clear that the tensioned retaining function of all of the biting fingers 33 and the retaining fingers 30 is balanced and uniform throughout the circumference of the retaining ring 25.

An advantageous feature of the internested relationship of the terminal portions 31 and the rounded junctures 32 of the respective retaining fingers 30 with the inner underturned marginal rounded flange 29 of the trim ring resides in the reinforcement afforded for the inner margin of the plastic trim ring while at the same time the trim ring is adapted to be freely flexed open as indicated in dash outline in Figure 2. In such opening flexure the flange 29 is backed up by the body member 12 and by reason of the substantial radius curvature of the inner marginal flange 29 there will be little, if any, tendency for concentration of flexure stresses at any localized points, but such stresses will be spread over a substantial inner marginal area, thereby saving the cover from premature cracking or breaking either from oft-repeated flexure or extreme opening flexure.

On the other hand, inward flexure of the trim ring 24 may occur relatively freely and here the finger flanges 31 back up but a relatively small inner marginal area of the trim ring. In so backing up the inner marginal area of the trim ring against inward flexure a desirable reinforcement and flexure stress dissipation is accomplished.

Since the trim ring 24 is held quite thoroughly clamped against the wheel body by the retaining fingers 30, axial, radial and rotary displacement of the trim ring 24 from its clamped position are effectively resisted. Among other things, this assures maintained centering of a valve stem 37 with respect to a valve stem aperture 38 in the trim ring.

I claim as my invention:

1. In a wheel structure including a flanged tire rim and a load sustaining body part, a trim ring for concealing the outer side of said tire rim and the junction of said body part with the tire rim and having its radially inner margin turned under to provide a curved flange, means for retaining the trim ring in position on the wheel comprising a member having a portion thereof retainingly nested within said marginal flange of the trim ring and attached to said tire rim, said retaining member being flexed into assembled relation with the wheel, and a stop finger on said retaining member extending generally axially inwardly and engaging at the juncture of the tire rim and body part to delimit the axially inward position of the retaining member in the fully assembled relation to the wheel.

2. In a wheel structure including a multi-flanged tire rim and a load sustaining body part, a trim ring for concealing the tire rim and the juncture of the tire rim and body parts, and means for retaining the trim ring in position including a member bridging between the tire rim and the body part axially inwardly concealed behind the trim ring and having generally axially inwardly extending stop elements projecting from the general plane of the body of the retaining member and engaging at the juncture of the tire rim and the body part for delimiting the axially inward position of the retaining member.

3. In a cover for a wheel including a multi-flanged tire rim and a load sustaining body part, a cover member, and a retaining member adapted to be pressed axially inwardly into retaining position bridging across generally opposed portions of the tire rim and the body part and having intermediate generally axially inwardly extending stop fingers for delimiting axially inward movement thereof in mounting the same upon the wheel.

4. In a cover for a wheel including a multi-flanged tire rim and a load sustaining body part, a cover member, and a retaining member adapted to be pressed axially inwardly into retaining position bridging across generally opposed portions of the tire rim and the body part and having intermediate generally axially inwardly extending stop fingers for delimiting axially inward movement thereof in mounting the same upon the wheel, said retaining member having integral radially outwardly extending rim engaging attaching fingers and generally radially inwardly extending retaining fingers assembled with the cover member.

5. In a cover for a wheel including a multi-flanged tire rim and a load sustaining body part, a cover member, and a retaining member adapted to be pressed axially inwardly into retaining position bridging across generally opposed portions of the tire rim and the body part and having intermediate generally axially inwardly extending stop fingers for delimiting axially inward movement thereof in mounting the same upon the wheel, said retaining member having retaining fingers extending in a generally radial direction therefrom and alternating with said stop fingers.

6. In a cover for a wheel including a multi-flanged tire rim and a load sustaining body part, a cover member, and a retaining member adapted to be pressed axially inwardly into retaining position bridging across generally opposed portions of the tire rim and the body part and having intermediate generally axially inwardly extending stop fingers for delimiting axially inward movement thereof in mounting the same upon the wheel, said retaining member having its normal plane extending generally radially and said stop fingers being integrally struck out therefrom and bent to extend in said generally axially inward direction.

7. In a retaining ring for a wheel cover assembly adapted to be pressed into position upon a wheel structure including a multi-flanged tire rim and a body part, a generally radially extending body portion having radially outwardly extending flexible biting fingers adapted to engage an intermediate flange of the tire rim, generally radially inwardly extending flexible clamping fingers adapted for engaging a portion of a cover member to clamp the same against the body part, and generally axially inwardly extending stop fingers to engage the wheel and delimit inward assembly movement of the retaining ring when it is being mounted upon the wheel.

8. In a cover structure for a wheel including a multi-flanged tire rim and a load bearing part, a resiliently flexible trim ring for concealing the tire rim and having its radially inner margin underturned to provide a rounded flange and adapted to seat on the wheel load bearing part, and a retaining ring having rounded flexible retaining fingers extending radially inwardly and internested in said trim ring flange and being adapted to clamp the trim ring flange against the wheel load bearing part, said fingers being axially flexible for individual tensioning thereof upon axially inwardly pressing of the retaining ring into clamping relation to the wheel body.

9. In a cover structure for a wheel including a multi-flanged tire rim and a load bearing part, a resiliently flexible trim ring for concealing the tire rim and having its radially inner margin underturned to provide a rounded flange and adapted to seat on the wheel load bearing part, and a retaining ring having rounded flexible retaining fingers internested in said trim ring flange and being adapted to clamp the trim ring flange against the wheel load bearing part, said retaining ring having radially outwardly extending biting fingers for engagement with an intermediate flange of the tire rim, the body portion of the retaining ring being manually engageable upon outward flexure of the trim ring for pressing the retaining ring into assembly with the wheel, said body portion having generally axially inwardly extending portions for engaging the wheel to delimit the extent to which the retaining ring can be pressed.

10. In a wheel structure including a tire rim of the drop center type formed with a plurality of stepped flanges and a central load bearing portion secured to the base flange of the tire rim, a cover for the outer side of the wheel structure including a member disposed in concealing relation to the tire rim and extending generally axially inwardly and radially inwardly and having an underturned portion engaging the wheel body, and a retaining ring member wedgingly engaging the tire rim and having radially inwardly extending resilient clamping fingers thereon engaging the underturned portion of the cover member and individually tensioned to hold the latter clamped against the load bearing portion of the wheel under tension.

11. In a wheel structure including a tire rim of the drop center type formed with a plurality of stepped flanges and a central load bearing portion secured to the base flange of the tire rim, a cover for the outer side of the wheel structure including a member disposed in concealing relation to the tire rim and extending generally axially inwardly and radially inwardly and having an underturned portion engaging the wheel body, and a retaining ring member wedgingly engaging the tire rim and having radially inwardly extending resilient clamping fingers thereon engaging the underturned portion of the cover member to hold the latter clamped against the load bearing portion of the wheel, said retaining member also having generally axially inwardly extending limit fingers engaging at the juncture of the tire rim and the load bearing portion and holding the retaining member in uniformly spaced relation to the wheel structure so that the pressure exerted by the radially inner retaining fingers thereof against the underturned portion of the cover member will be substantially uniform throughout the inner circumference of the retaining ring.

GEORGE ALBERT LYON.

REFERENCES CITED

The following references are of record in the file of this patent:

UNITED STATES PATENTS

| Number | Name | Date |
| --- | --- | --- |
| 1,948,273 | Lyon | Feb. 30, 1934 |
| 2,193,104 | Lyon | Mar. 12, 1940 |
| 2,361,406 | Lyon | Oct. 31, 1944 |
| 2,386,233 | Lyon | Oct. 9, 1945 |